(12) United States Patent
Peloski

(10) Patent No.: US 10,990,599 B2
(45) Date of Patent: Apr. 27, 2021

(54) SYSTEM AND METHOD FOR OBJECT-ORIENTED PATTERN MATCHING IN ARBITRARY DATA OBJECT STREAMS

(71) Applicant: Aria Solutions, Inc., Calgary (CA)

(72) Inventor: Paul Peloski, Calgary (CA)

(73) Assignee: ARIA SOLUTIONS, INC., Calgary (CA)

( * ) Notice: Subject to any disclaimer, the term of this patent is extended or adjusted under 35 U.S.C. 154(b) by 71 days.

(21) Appl. No.: 16/214,620

(22) Filed: Dec. 10, 2018

(65) Prior Publication Data

US 2019/0258641 A1    Aug. 22, 2019

Related U.S. Application Data

(63) Continuation-in-part of application No. 16/160,763, filed on Oct. 15, 2018, now abandoned.

(60) Provisional application No. 62/572,537, filed on Oct. 15, 2017.

(51) Int. Cl.
| | | |
|---|---|---|
| *G06F 16/24* | (2019.01) | |
| *G06F 16/2455* | (2019.01) | |
| *G06F 16/23* | (2019.01) | |
| *G06F 16/28* | (2019.01) | |

(52) U.S. Cl.
CPC .... *G06F 16/24568* (2019.01); *G06F 16/2379* (2019.01); *G06F 16/289* (2019.01)

(58) Field of Classification Search
CPC ........... G06F 16/9535; G06F 16/90344; G06F 9/4498; G06F 2207/025; G06F 16/137; G06F 16/9038; G06F 16/221; G06F 16/24568; G06F 16/289
See application file for complete search history.

(56) References Cited

U.S. PATENT DOCUMENTS

| | | | | |
|---|---|---|---|---|
| 9,270,641 | B1 * | 2/2016 | Preston | ............... H04L 63/0245 |
| 2007/0006293 | A1 * | 1/2007 | Balakrishnan | ...... H04L 63/1408 726/13 |

* cited by examiner

*Primary Examiner* — Etienne P Leroux
*Assistant Examiner* — Cindy Nguyen
(74) *Attorney, Agent, or Firm* — Brian R. Galvin; Galvin Patent Law LLC

(57) ABSTRACT

A system and method for applying extended regular expressions against arbitrary data objects, wherein a state machine maintains an internal state model for the system, an object analysis server receives data objects from a data source, and the object analysis server analyzes the structure and contents of the objects, compares them against received search pattern, and directs the state machine to update the state model based on either or both of the analysis and comparison operations.

11 Claims, 14 Drawing Sheets

SYSTEM AND METHOD FOR OBJECT-ORIENTED PATTERN MATCHING IN ARBITRARY DATA OBJECT STREAMS

CROSS-REFERENCE TO RELATED APPLICATIONS

This application is a continuation-in-part of U.S. patent application Ser. No. 16/160,763 titled "SYSTEM AND METHOD FOR APPLYING EXTENDED REGULAR EXPRESSIONS AGAINST ARBITRARY DATA OBJECTS", filed on Oct. 15, 2018, which claims priority to U.S. provisional patent application Ser. No. 62/572,537, titled "SYSTEM AND METHOD FOR APPLYING EXTENDED REGULAR EXPRESSIONS AGAINST ARBITRARY DATA OBJECTS", which was filed on Oct. 15, 2017, the entire specification of each of which is incorporated herein by reference.

BACKGROUND

Field of the Art

The disclosure relates to the field of information technology, and more particularly to the field of object-oriented pattern matching for data objects and their contents.

Discussion of the State of the Art

Regular expressions are commonly used to search for patterns in bodies of text for rapid comparison, used in search engines and data operations. By expanding the principles of expression-based pattern matching to object-oriented data, efficient searching of object-based data types and their contents becomes possible, combining the benefits of object-oriented data modeling and pattern-based searching.

What is needed, is a means to apply pattern-based search principles to object-oriented data by maintaining a stateful search process that compares a search pattern against the contents and attributes of data objects, and that can be used to search against objects over time by maintaining records of object changes.

SUMMARY

Accordingly, the inventor has conceived and reduced to practice, a system and method for identifying patterns among data objects within arbitrary streams of data objects. The system comprises a syntax, a parser, a compiler, and a state machine. The syntax allows a user to define relationships between data objects, is used for building patterns of interest for the system to use in identifying patterns, and is similar in structure to regular expression syntax in the field of text searching. It differs from regular expressions, however, in that it is being used to identify patterns among data objects instead of patterns of text within a data object. The parser converts the pattern into an abstract syntax tree data structure which can be used to analyze, programmatically modify, and compile the pattern. The compiler converts the abstract syntax tree into state machine instructions. The state machine follows the instructions to match objects containing elements of the pattern in a stream of arbitrary data objects. During operation, as each object is received, it is analyzed to determine whether any of its data fields contain any element of a pattern of interest. If the object does not contain an element of a pattern being searched for, the object is discarded and the next object is retrieved. If the object contains an element of a pattern, and there are no state machines (typically created as processing threads) currently waiting for an object with that element, a new state machine is created with that object as the first element of the matching pattern. If the object contains an element of a pattern being searched for, and there is an existing state machine waiting for that element, the object is added to the existing state machine as having a matching element, and the next object is retrieved from the data stream. When any state machine completes a pattern matching sequence, the identified pattern and sequence of objects identified as containing the pattern is stored or displayed.

According to a preferred embodiment, a system for object-oriented pattern matching in arbitrary data object streams, comprising: at least one state machine comprising at least a plurality of programming instructions stored in the memory of, and operating on at least one processor of, a computing device, wherein the plurality of programming instructions, when operating on the at least one processor, cause the computing device to: maintain an internal state model; and return a result when a final state has been reached, the final state being determined by the internal state model; and an object analysis server comprising at least a plurality of programming instructions stored in the memory of, and operating on at least one processor of, a computing device, wherein the plurality of programming instructions, when operating on the at least one processor, cause the computing device to: receive a plurality of data objects from a data source; analyze at least a portion of the data objects to determine at least their information structure and contents; receive a search pattern comprising at least one element; compare at least a portion of the data objects against at least one pattern of the search pattern, the comparison operation comprising at least the comparison of at least one element of a search pattern against the contents of a data object; create a new instance of a state machine when the comparison indicates that the object contains an element associated with the start of a search pattern, and associate that object with that state machine and the object's location in the search pattern for that state machine; update an instance of a state machine when the comparison indicates that the object contains an element associated with an element of a search pattern for which that state machine is waiting, and associate that object with that state machine and the object's location in the search pattern for that state machine; return the results of the operation of at least one state machine.

According to a preferred embodiment, a method for object-oriented pattern matching in arbitrary data object streams, comprising the steps of: maintaining an internal state model, using at least one state machine; returning a result when a final state has been reached, the final state being determined by the internal state model, using at least one state machine; receiving a plurality of data objects from a data source, using an object analysis server; analyzing at least a portion of the data objects to determine at least their information structure and contents, using an object analysis server; receiving a search pattern comprising at least one element, using an object analysis server; comparing at least a portion of the data objects against at least one pattern of the search pattern, the comparison operation comprising at least the comparison of at least one element of a search pattern against the contents of a data object, using an object analysis server; creating a new instance of a state machine when the comparison indicates that the object contains an element associated with the start of a search pattern, and associating that object with that state machine and the object's location in the search pattern for that state machine, using an object analysis server; updating an instance of a state machine when the comparison indicates that the object contains an element associated with an element of a search pattern for which that state machine is waiting, and associate that object with that state machine and the object's location in the search pattern for that state machine, using an object analysis server; and returning the results of the operation of at least one state machine.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
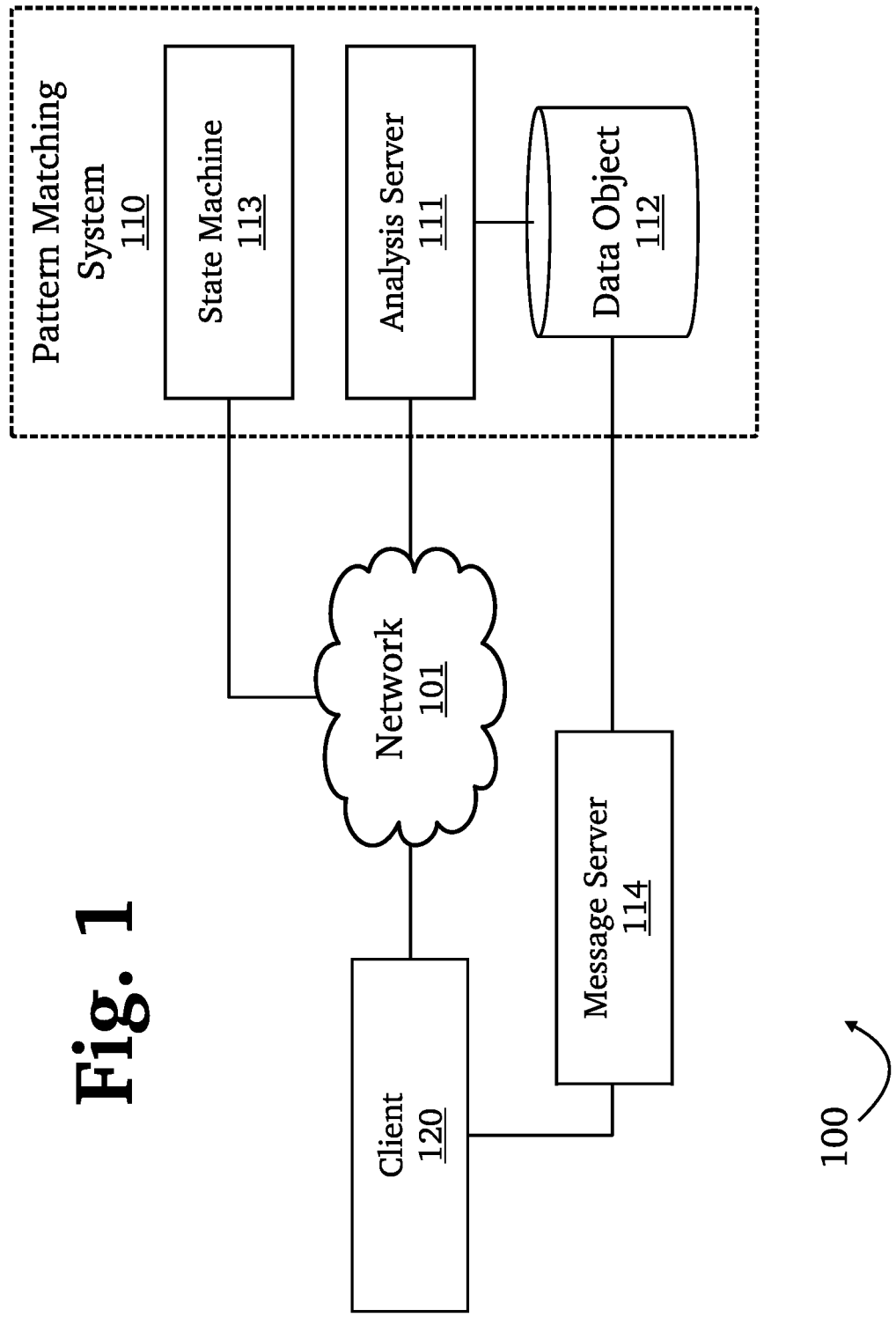
FIG. 1 is a block diagram illustrating an exemplary system architecture for identifying patterns among data objects within arbitrary streams of data objects, according to one aspect.

The inventor has conceived, and reduced to practice, a system and method for identifying patterns among data objects within arbitrary streams of data objects. The system comprises a syntax, a parser, a compiler, and a state machine. The syntax is used for building patterns of interest for the system to use in identifying patterns, and is similar in structure to regular expression syntax in the field of text searching. It differs from regular expressions, however, in that it is being used to identify patterns among data objects instead of patterns of text within a data object.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the inventions, and it should be appreciated that other arrangements may be utilized and that structural, logical, software, electrical and other changes may be made without departing from the scope of the particular inventions. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for identifying patterns among data objects within arbitrary streams of data objects, according to one aspect. A pattern-matching system 110 may receive connections from a client 120 application via a network 101 such as the Internet or a local area network (LAN), for example to submit a search query against a data object 112, which may be an object received from a data stream, or retrieved from data storage such as in a database, or any other data object from an information source. For example, a client application 120 may be an administration application for requesting or verifying data in an object database 112 or other database management tasks, or it may be (for example) any of a variety of systems that may receive and process streaming data 112 for use, or any of a variety of contact center systems used in handling interaction events such as (for example) an interactive voice response (IVR) system in a contact center that may receive responses and input from a caller, or a customer relations management (CRM) application that handles customer account information and may provide updates to messaging server 114 as changes are made to customer information (for example, when a new bill is generated, or contact information is updated, or account changes are made, or other such modifications), which may then be used to update the contents of objects in the database 112.

According to the aspect, a pattern-matching system 110 may comprise an object analysis server 111 configured to receive data objects 112 as input (for example, streaming events in a contact center such as events from a particular call) and analyze received data objects 112 to determine their structure and contents, and then direct a state machine 113 to maintain an internal state corresponding to the inputs received. This enables the use of state awareness to track data objects as they change over time until arriving at a final state that may be returned as output. State machine 113 may utilize a nondeterministic finite automaton (NFA), such that with each input received the internal state model may remain the same, or it may change to one of any number of possible new states, and so on as input is received until a final input is handled and the NFA arrives at the final output state. In the context of pattern-matching, this may be used to receive object information as inputs, maintaining a stateful model that reflects the data contained within the objects and the status of a current match being performed, to provide functionality necessary for matching multiple objects against one another and maintaining awareness of partial matches, reaching a final state when a complete match is found (or if no complete match can be found, once the search is complete). For example, if a client 120 submits a query for "[Type='EventAbandoned' and UserData.X='Y'] A [any]* [Type='EventQueued' and ANI=A.ANI and A.Time−Time<300] B", this would return all events such that A is an EventAbandoned with specific user data and B is an EventQueued with an ANI that matches A and occurring less than 5 minutes later. This requires examining multiple messages and comparing them to one another, functionality that may be provided by using an internal state model to track multiple objects at once during operation.

Being a nondeterministic state machine (that is, one wherein the state may remain the same through a state transition, rather than being required to change to exactly one possible new state), analysis server 111 may optionally use a Boyer-Moore string search algorithm to improve efficiency by using the internal state model of state machine 113 to search for partial matches and skip through information rather than by using a "brute-force" comparison of every portion of data. In traditional Boyer-Moore searching, a string pattern is preprocessed before comparison against a body of text, so that the pattern remains in memory. To check for a match, the tail end of a string pattern is checked against a selection of text and if the end of the pattern does not match and the text against which it is being compared does not occur anywhere in the pattern (this is usually performed on a letter-by-letter basis, so if the letter in the text does not exist in the pattern) then the search may "skip ahead" by the length of the pattern to greatly improve efficiency without missing possible matches. In an object-oriented context, a similar approach may be utilized wherein a search pattern may be preloaded into memory, and then the data contained within the query (for example, if a search is being performed for specific values for a variable X) may be used to determine whether an object may be skipped. For example, if the current object does not contain the variable X, then it may be skipped and the next object loaded (rather than thoroughly examining the contents of the object for comparison). This may be further enhanced with knowledge of object types and their contents 112 (for example, the previous exemplary search may be further economized by simply checking whether the current object's type can contain the variable X, without even looking at its contents yet).

A message server 114 may be utilized to receive event messages from external systems operating as clients 120, for example (in a contact center usage context) to receive update messages regarding an ongoing interaction with a customer. These messages may then be used to update the contents of data objects 112, and the updated objects may then be analyzed by object analysis server 111 and provided to state machine 113 for use as input, enabling matching of objects as they change in real-time. Additionally, by combining event messages with the stateful internal model provided by state machine 113, it becomes possible to examine not only static objects but also objects over time, for example the progression of a call or other interaction in a contact center, either historically or as the interaction is ongoing, by tracking event messages at messaging server 114 and the corresponding object data 112, incorporating change-over-time into the state model of state machine 113 to enable searching against an object or its contents at a particular point in time, or searching against patterns of object changes, such as (for example) searching for interactions that contain particular progression patterns or to match specific causal relationships between event updates and object changes.

DETAILED DESCRIPTION OF EXEMPLARY EMBODIMENTS

Figure 2:
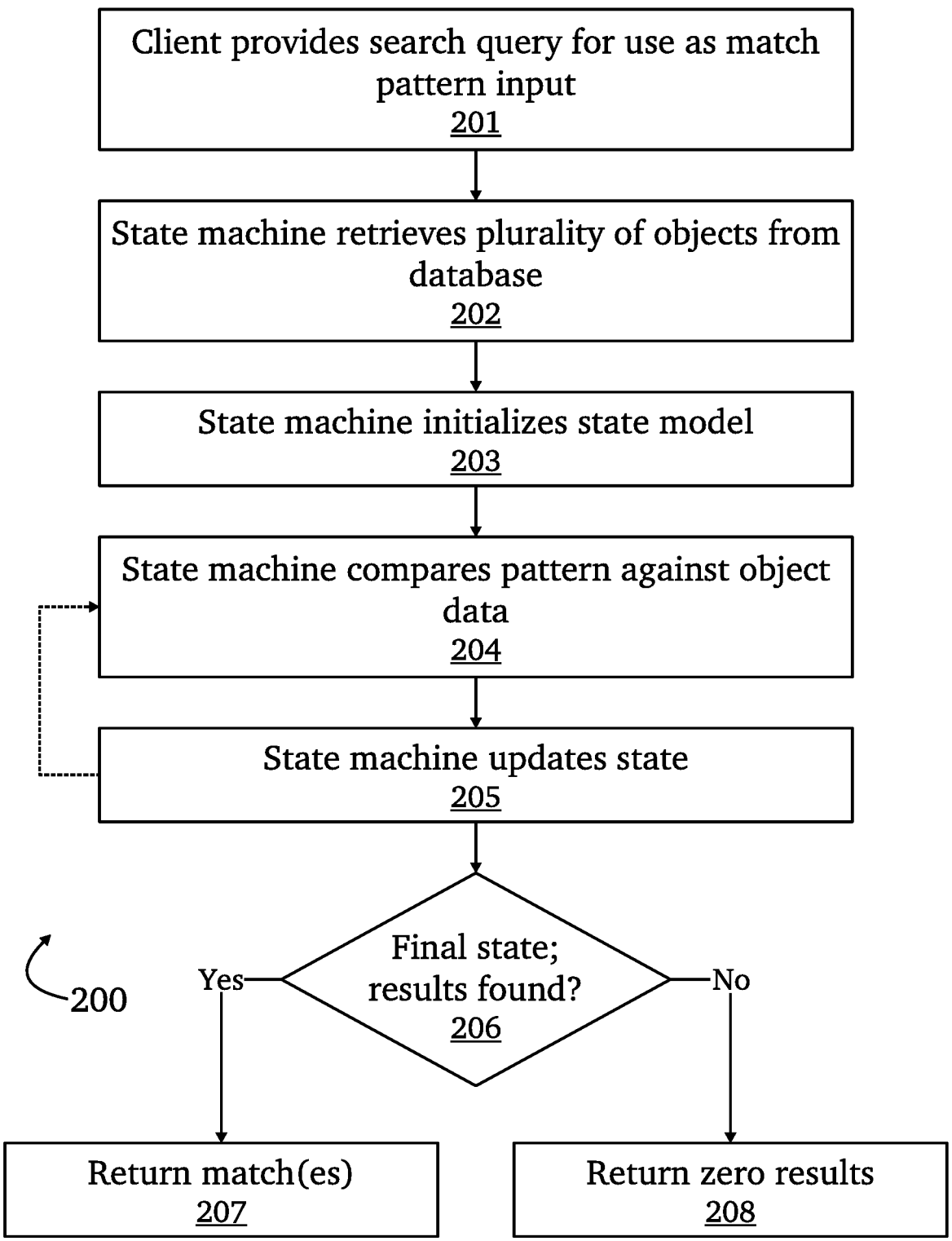
FIG. 2 is a flow diagram illustrating an exemplary method for identifying patterns among data objects within arbitrary streams of data objects, according to one aspect.

FIG. 2 is a flow diagram illustrating an exemplary method 200 for identifying patterns among data objects within arbitrary streams of data objects, according to one aspect. According to the aspect, a general process for object-oriented pattern matching may involve examining the data contained within software objects while maintaining an internal state model reflecting the current state of a matching operation being performed. In an initial step 201, a client 120 may submit a query comprising an expression describing a pattern of object data to match against, the object data comprising a plurality of object contents (and therefore optionally entire objects, by comprising their complete contents). In a next step 202, state machine 111 may retrieve a plurality of objects from an object database 112, based on the received input, and may then 203 generate an initial internal state model at the beginning of a matching operation. In next step 204, state machine 111 may begin comparing object data from the retrieved plurality of objects against the input query, optionally updating the internal state model 205 as the operation progresses. If a final state is reached 206, the state model is then checked to determine whether a match (or multiple matches) was found, returning the match result 207. If no match was found and the data was exhausted, the search returns a zero result 208.

Figure 3:
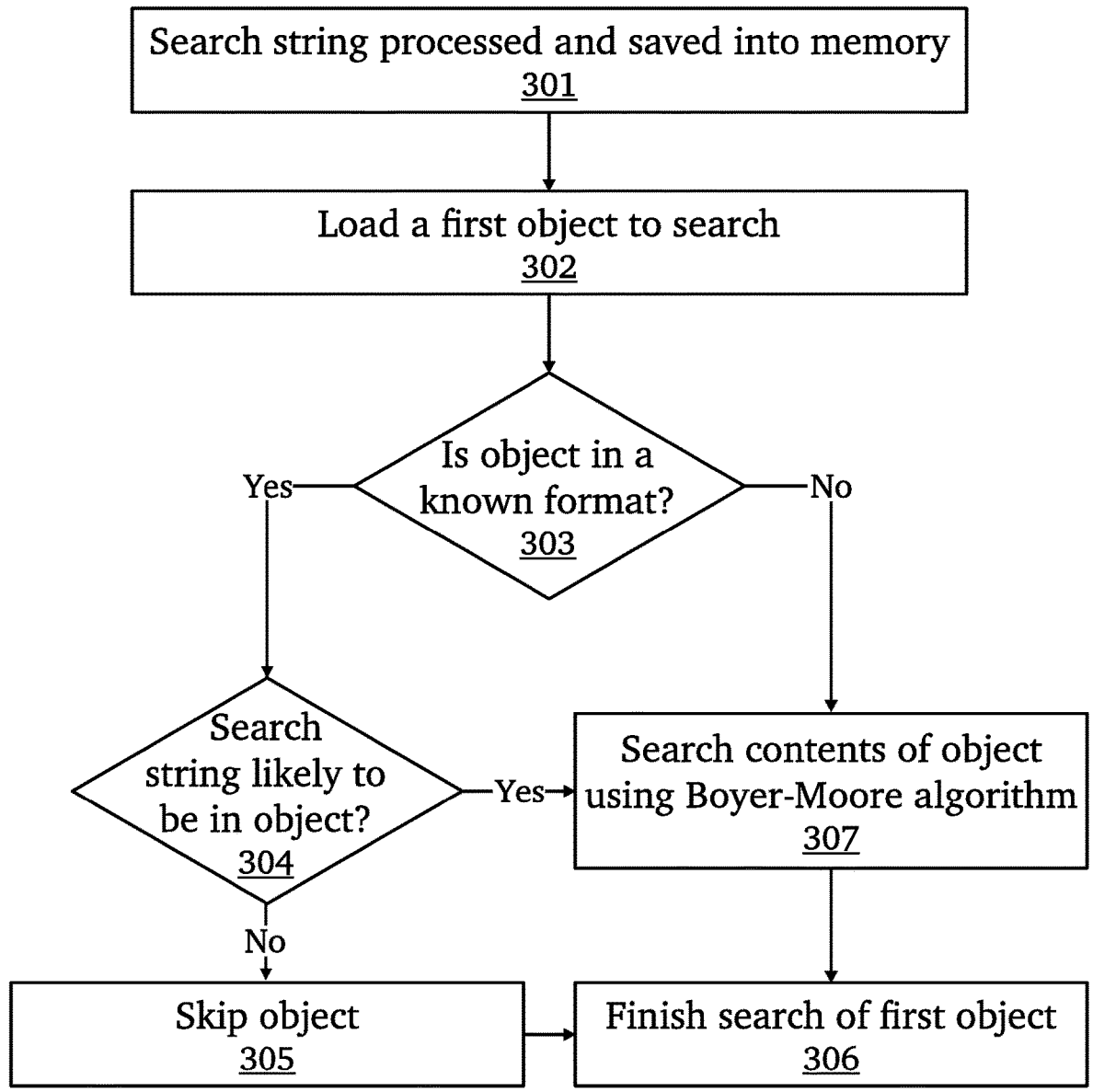
FIG. 3 is a flow diagram illustrating an exemplary method for applying Boyer-Moore search algorithm in search data objects, according to one aspect.

FIG. 3 is a flow diagram illustrating an exemplary method 300 for applying Boyer-Moore search algorithm in search data objects, according to one aspect. As an initial step 301, a search query may be processed and saved to memory by system 110. Processing may involve, for example, processing the data to determine context in order to more efficiently search objects. For instance, it may be determined whether the search query is a variable, a string commonly used within certain contexts (such as entries for a call log), and the like. At step 302, a first data object may be loaded to search run the search query against. At step 303, the loaded object is checked by analysis server 111 to determine whether the context and format of the data object is known. If context is known, at step 304, analysis server determines whether that particular object may contain the search query. If not, the object may be skipped at step 305, and the search of the first object concludes at step 306. If there are more data objects to search, a next data object may be loaded, and the search may proceed until there are no more data objects to load. If any matches are found, results may be displayed. On the other hand, if the object is likely to contain the search query at step 304, a search may be conducted on the object using a Boyer-Moore search algorithm 307, and the search concludes at step 306. If there are more data objects to search, a next data object may be loaded, and the search may proceed until there are no more data objects to load. If any matches are found, results may be displayed.

Returning to step 304, if the format of the object is not known a search may be conducted on the object using a Boyer-Moore search algorithm, and the search concludes at step 306. If there are more data objects to search, a next data object may be loaded, and the search may proceed until there are no more data objects to load. If any matches are found, results may be displayed.

Figure 4:
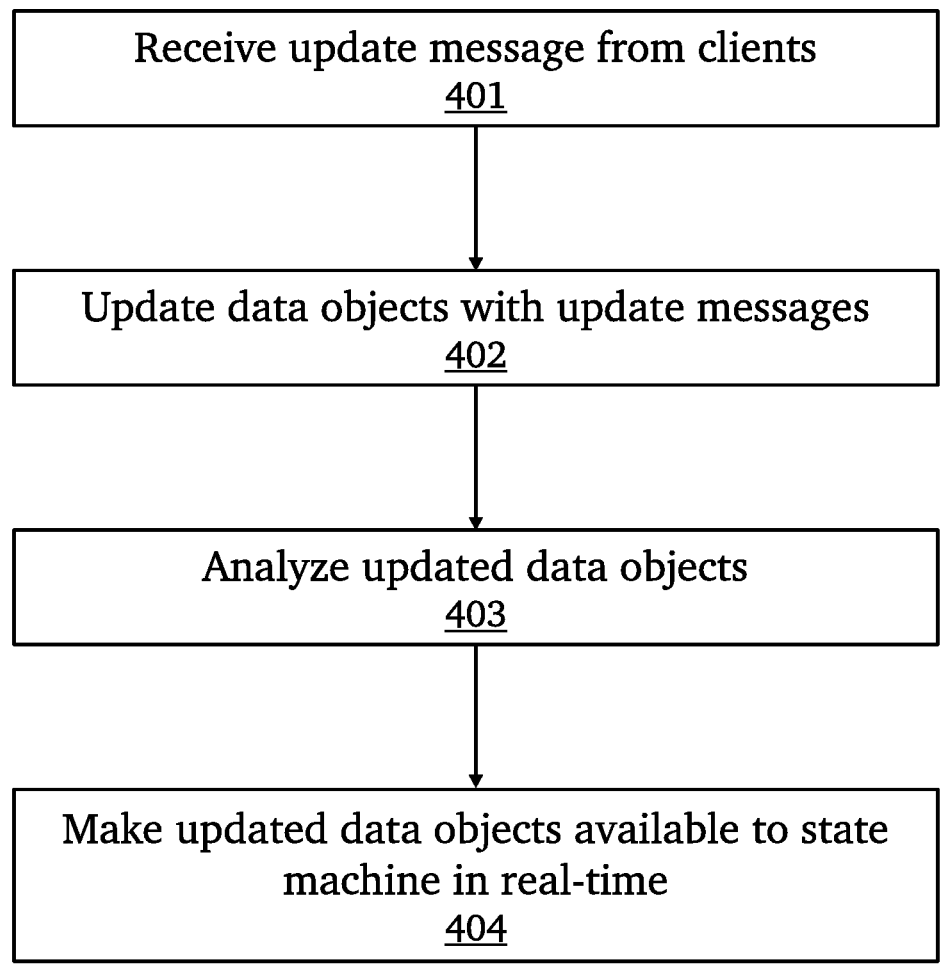
FIG. 4 is a flow diagram illustrating an exemplary method for updating data objects with client-provided update messages, according to one aspect.

FIG. 4 is a flow diagram illustrating an exemplary method 400 for updating data objects with client-provided update messages, according to one aspect. At an initial step 401, update messages may be received by message server 114 from client 120. For example, update messages may comprise interactions from an ongoing call with a customer, and logs or other data objects may be updated in real-time as the call advances. At step 402, data objects may be updated based on the received update messages by system 110. At step 403, analysis server 111 may analyze the updated data objects. At step 404, the updated data objects may then be made available to state machine 113 to search through in real-time. As discussed above (referring to FIG. 1), updated states may not be the only available states which may be used in searches. Various metadata may be made searchable as well, for example, how a data object changed, searching a data object at a particular point in time, searching for changes made over time, and the like.

FIGS. 9-14 show an example of pattern matching using one possible embodiment of the system in which there is a single data stream and multiple state machines. It is assumed for purposes of this example that each data object is read only once, and that a data handler assigns the object to only one state machine that is waiting for an object with a field contained in the object. In other embodiments, there may exist a single data stream and a single state machine which matches patterns sequentially. In cases where there is interleaving or nesting of patterns in the data stream (for example, a pattern ABC with a data stream containing AAABBBCCC), a single data stream may be partitioned into multiple data streams, and a single state machine may be assigned to each partitioned data stream. There are many possible variations and configurations of the system. The syntax used by the system allows a user to specify the relationships may take a variety of forms. In some embodiments, the syntax may allow for any combination of separations, substitutions, or unknowns (for example Kleene stars, also known as Kleene operators), time components, or other relations among objects to be defined. For example, if the pattern being sought is [A][B][C], the system would search for [A][B][C], with no intervening data objects. A Kleene operator might be inserted, such as in [A][true][C] would find exactly one object of any type between objects matching predicates A and C, and [A][true]*[C] would find zero or more objects of any type A between objects matching predicates A and C. A person of ordinary skill in the art will be aware of a wide variety of relations that may be defined for use in the syntax of the system.

Figure 9:
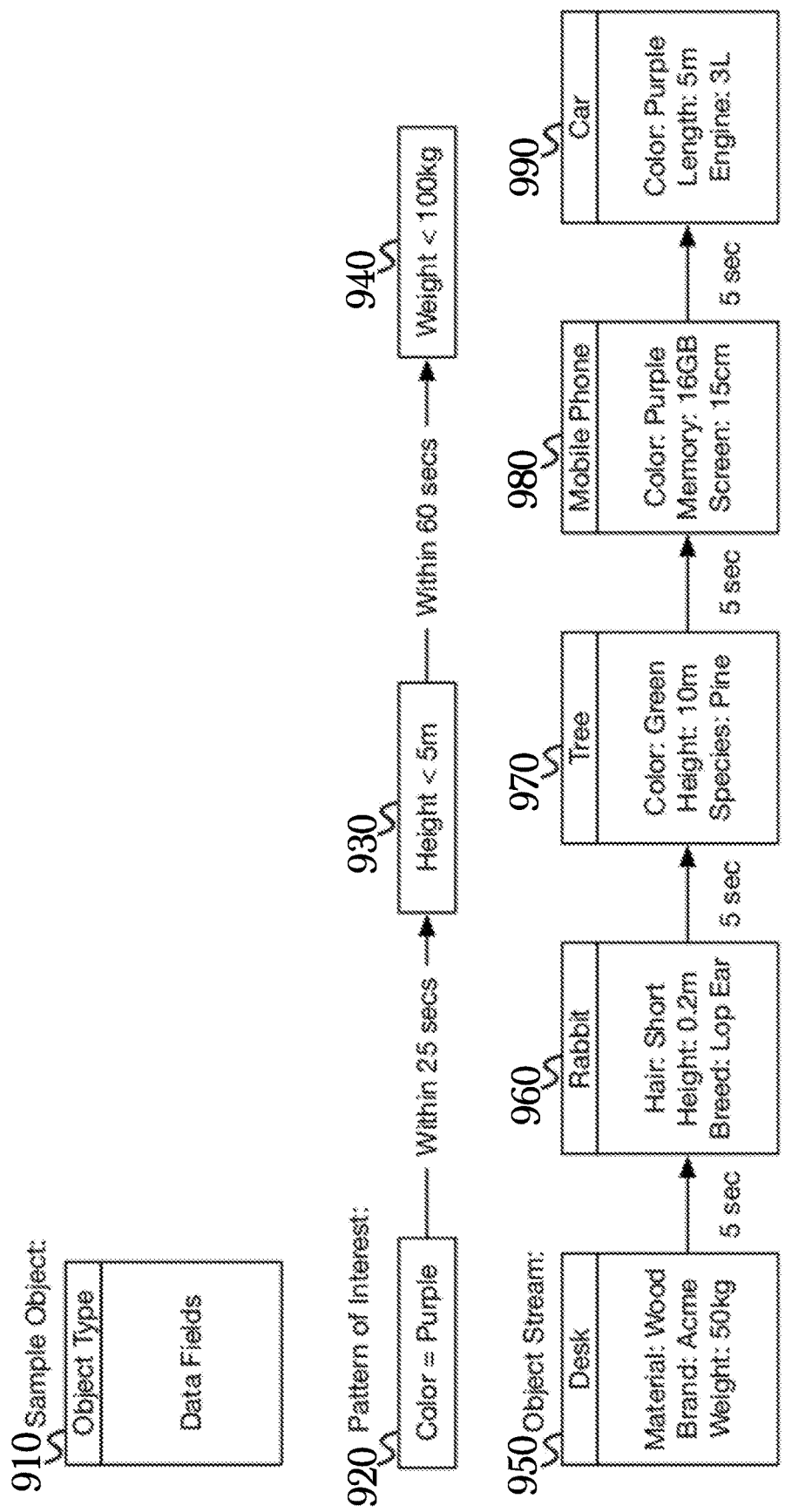
FIG. 9 is a diagram illustrating the setup of a simplified pattern matching example, according to an aspect of an embodiment.

FIG. 9 is a diagram illustrating the setup of a simplified pattern matching example, according to an aspect of an embodiment. A sample data object 910 represents a data object which contains an object type, and data fields, which is a well-known paradigm in computer science with entire programming languages using this paradigm in object-oriented programming (OOP). A given pattern of interest may be specified in the system, which may, for example, begin with analyzing any given object stream for objects with the data field "Color=Purple" 920, before beginning to look for objects with "Height<5 m" 930 after 25 seconds of looking for objects with a given color 920, before progressing further to a final pattern specification of "Weight<100 kg" 940, to match objects of a certain weight, after 60 seconds of receiving incoming objects. A given object stream is visualized containing objects in a stream such as a desk 950, a rabbit 960, a tree 970, a mobile phone 980, and a car 990 with the car being at the "head" of the stream, meaning it is the first object sent from the stream to the system to be matched by a pattern of interest.

Figure 10:
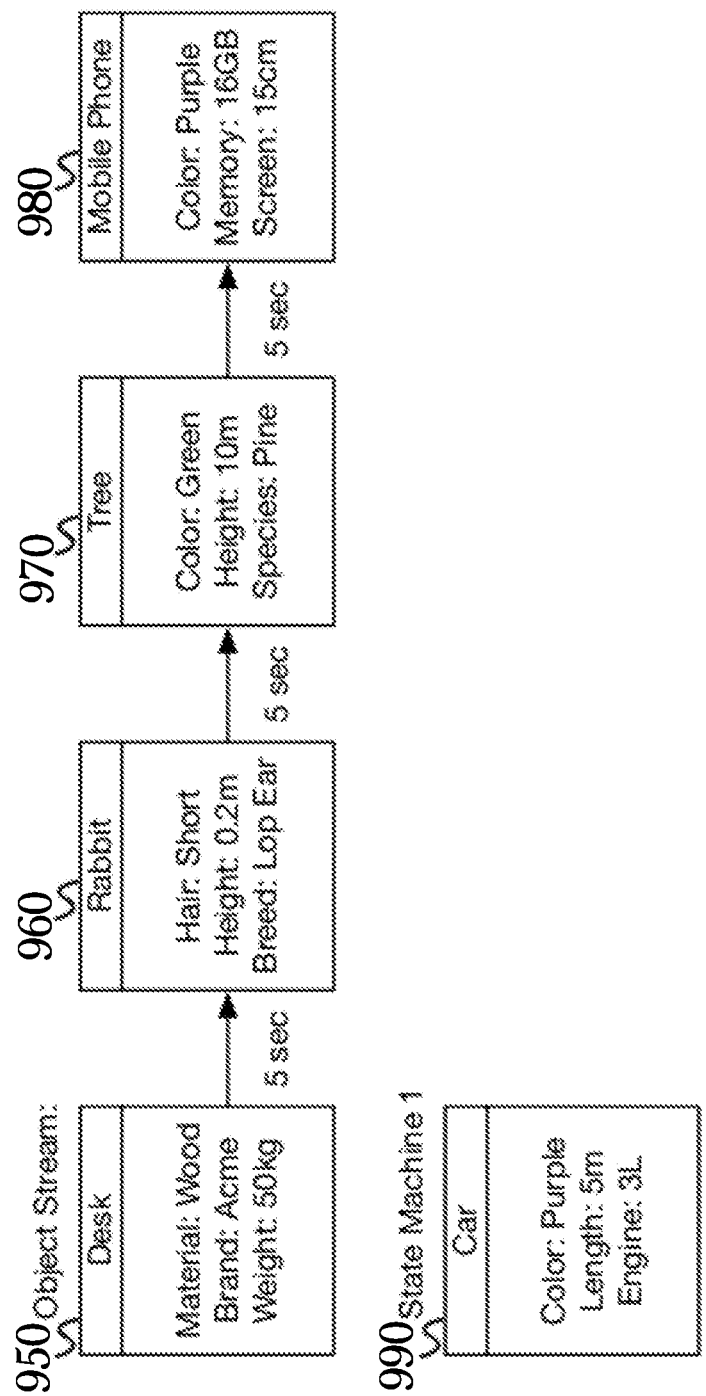
FIG. 10 is a diagram illustrating a step of the pattern matching process for the simplified pattern matching example setup from FIG. 9.

FIG. 10 is a diagram illustrating a step of the pattern matching process for the simplified pattern matching example setup from FIG. 9. As shown in the diagram, a first state machine is created as the data field "Color: Purple" in a first data object, a car 990, matches the initial pattern element of "Color=Purple" 920 from the pattern of interest.

Figure 11:
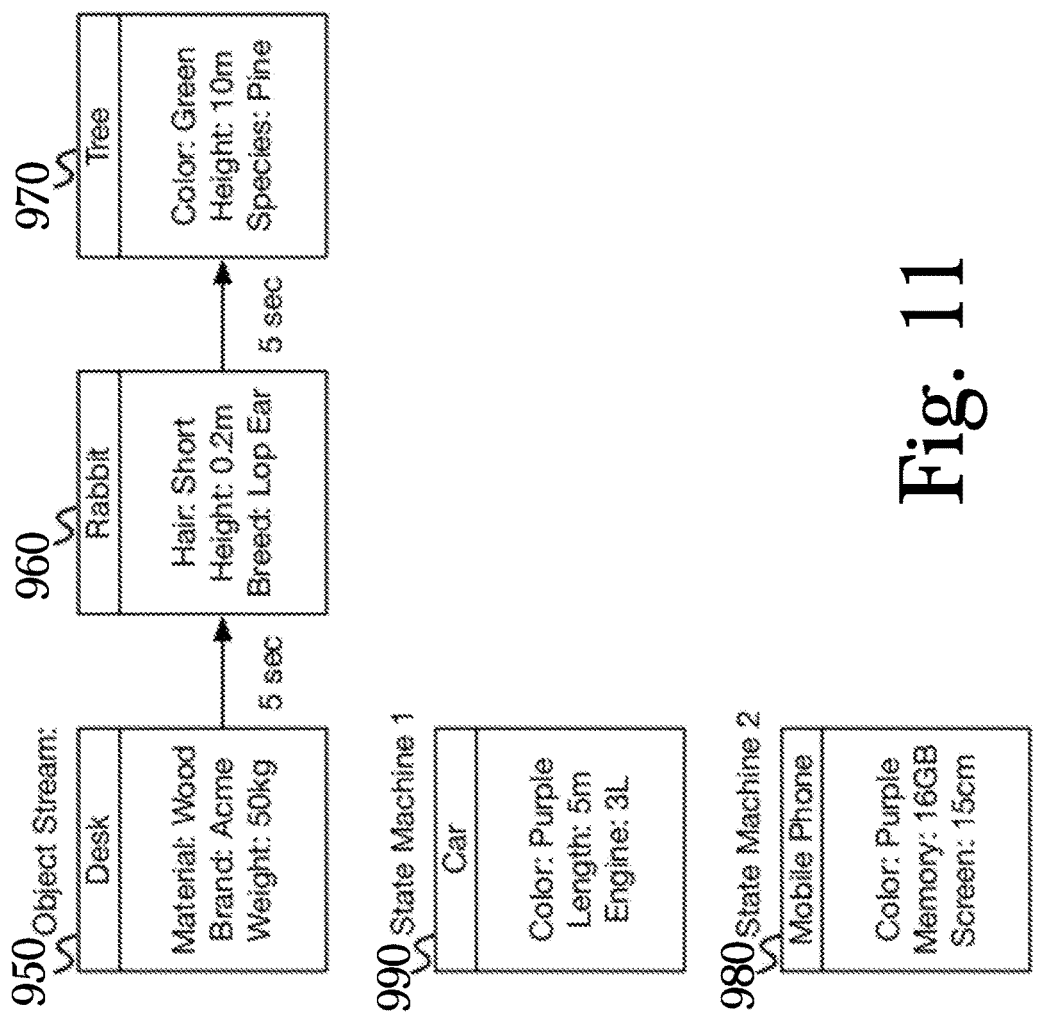
FIG. 11 is diagram illustrating a step of the pattern matching process for the simplified pattern matching example setup from FIG. 9.

FIG. 11 is diagram illustrating a step of the pattern matching process for the simplified pattern matching example setup from FIG. 9. After five seconds, a second state machine is created as the data field "Color: Purple" in a second data object, a mobile phone 980, matches the initial pattern element of "Color=Purple" 920 from the pattern of interest.

Figure 12:
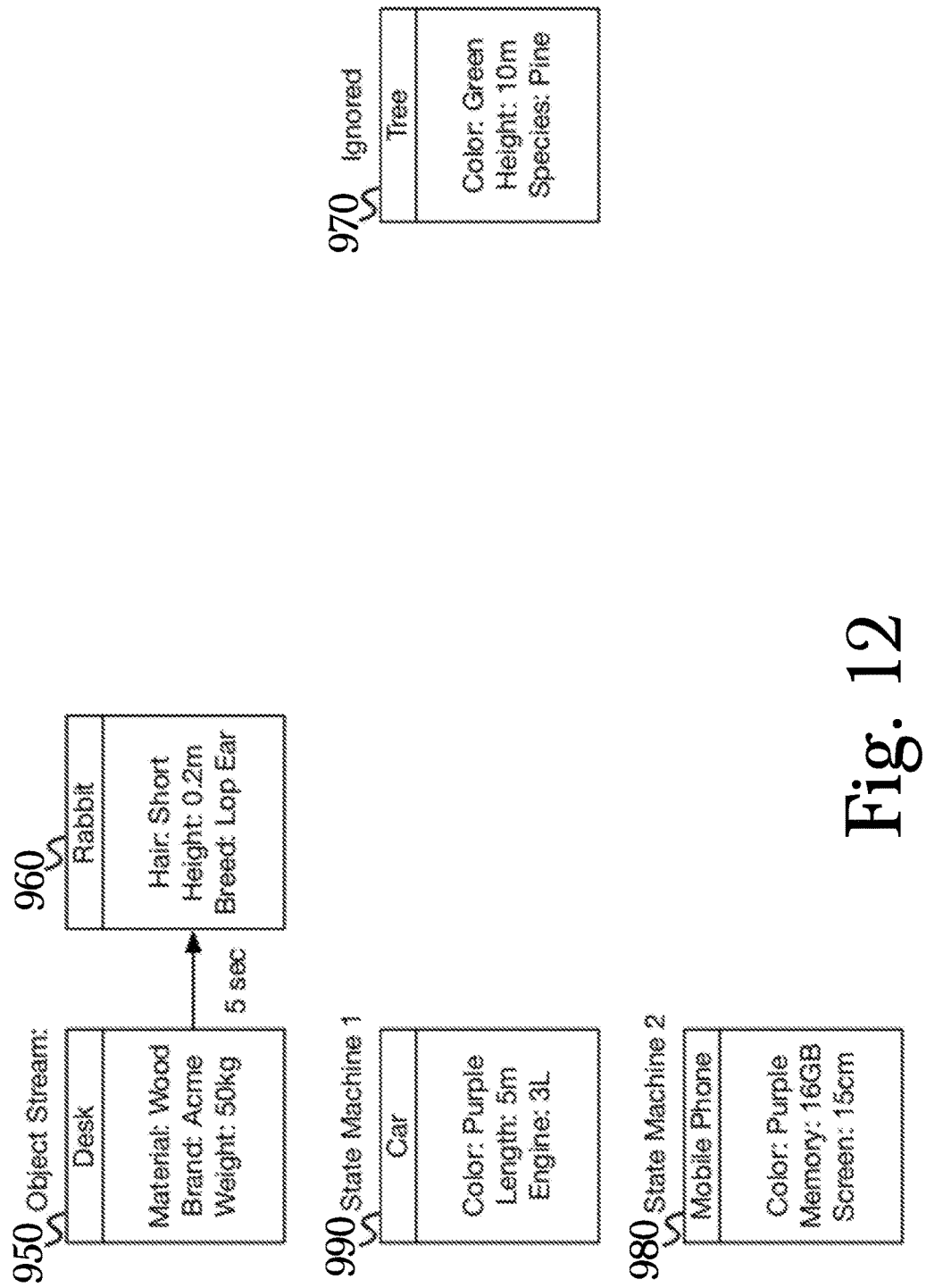
FIG. 12 is a diagram illustrating a step of the pattern matching process for the simplified pattern matching example setup from FIG. 9.

FIG. 12 is a diagram illustrating a step of the pattern matching process for the simplified pattern matching example setup from FIG. 9. After another five seconds (totaling 10 seconds since objects began streaming), an object "Tree" 970, which does not match any element of the pattern of interest 920, is ignored by the system, neither instantiating a state machine for analysis nor adding the object to an existing state machine.

Figure 13:
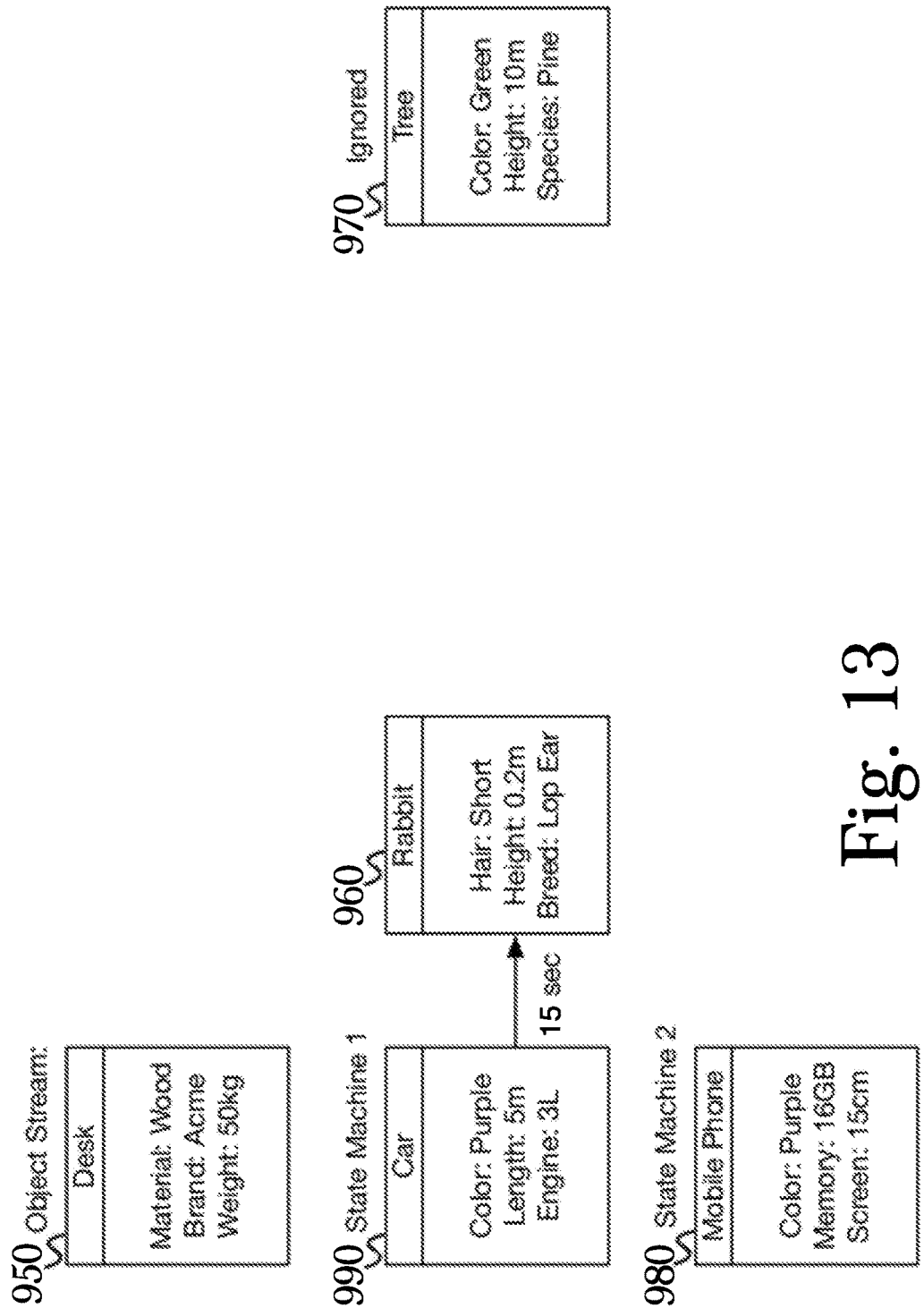
FIG. 13 is diagram illustrating a step of the pattern matching process for the simplified pattern matching example setup from FIG. 9.

FIG. 13 is diagram illustrating a step of the pattern matching process for the simplified pattern matching example setup from FIG. 9. After another five seconds, totaling 15 seconds since objects began streaming, a data field "Height: 0.2 m" of the rabbit object 960 matches the second element of the pattern of interest "Height<5 m" 930 for which the first state machine is waiting. The rabbit object 960 has arrived within the 25 seconds specified from the first element 920 of the pattern of interest to the second element 930 of the pattern of interest, so the rabbit object 960 is added to the first state machine, representing a continuation of the pattern in the first state machine.

Figure 14:
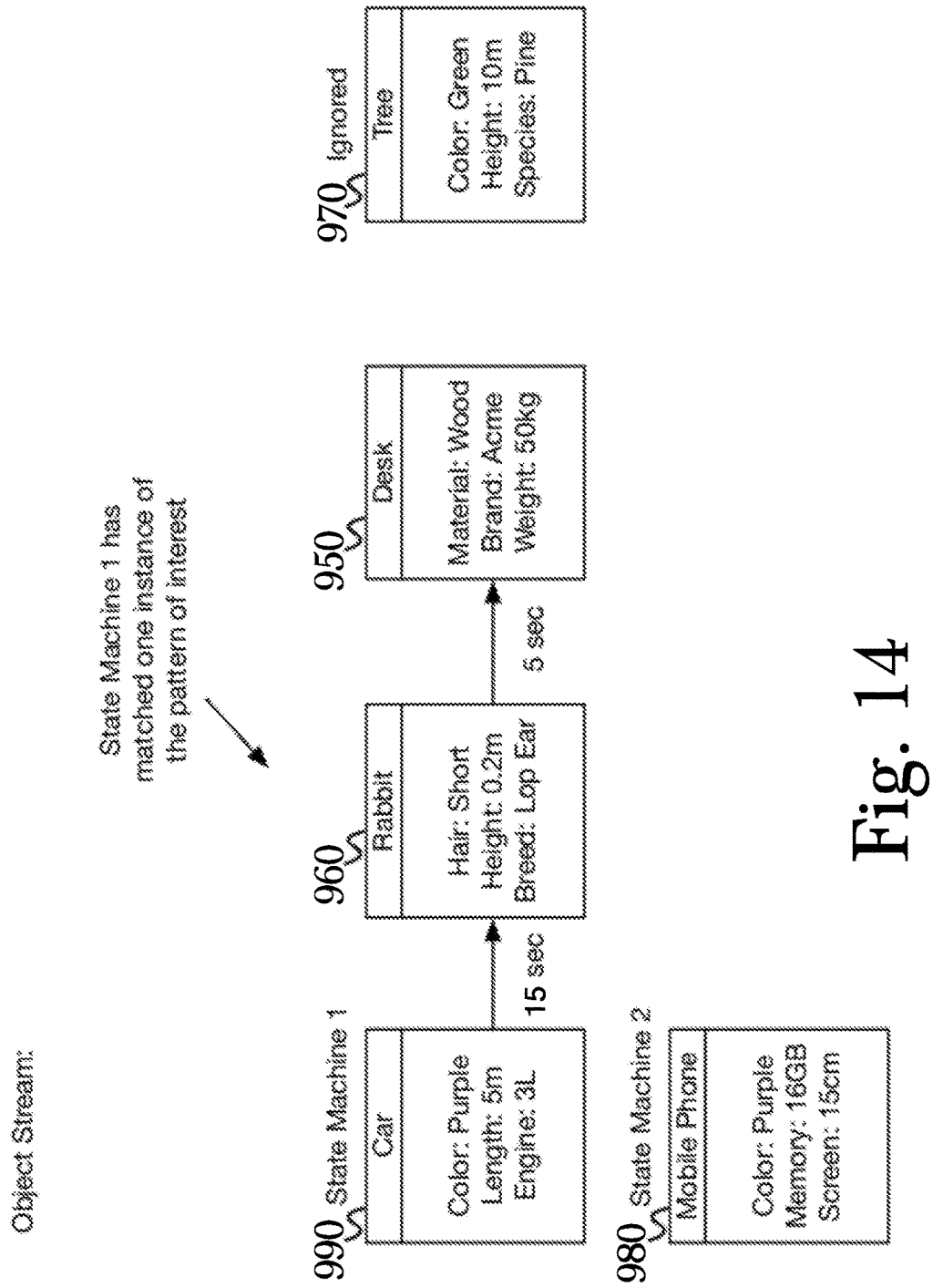
FIG. 14 is diagram illustrating a step of the pattern matching process for the simplified pattern matching example setup from FIG. 9.

FIG. 14 is diagram illustrating a step of the pattern matching process for the simplified pattern matching example setup from FIG. 9. After five seconds from the previous object sent, a desk object 950, matches a third pattern element "weigh<100 kg" 940 for which the first state machine is waiting. The desk object 950 has arrived within the 60 seconds specified from the second element 930 of the pattern of interest to the third element 940 of the pattern of interest, so the desk object 950 is added to the first state machine, matching one instance of the pattern and completing the operation of the first state machine.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 5:
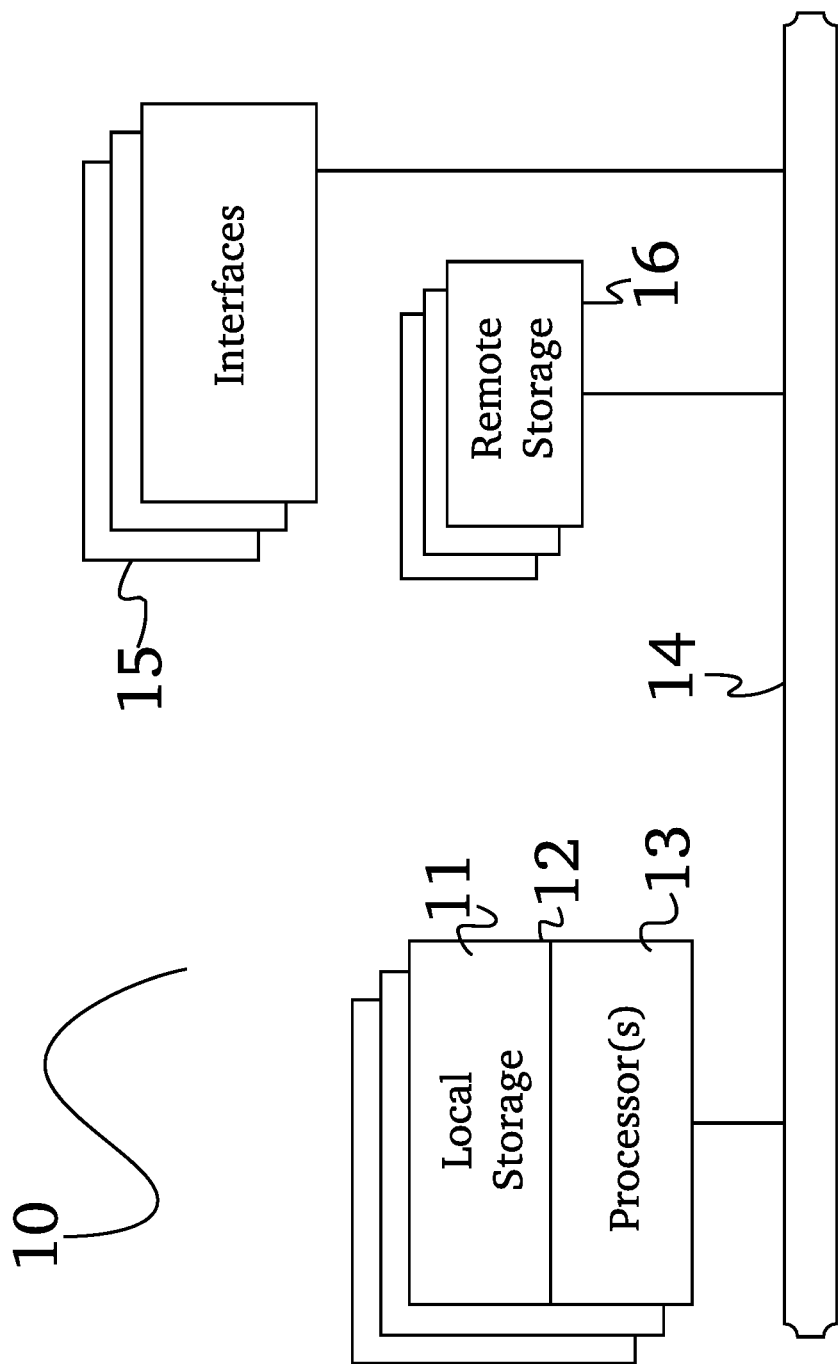
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
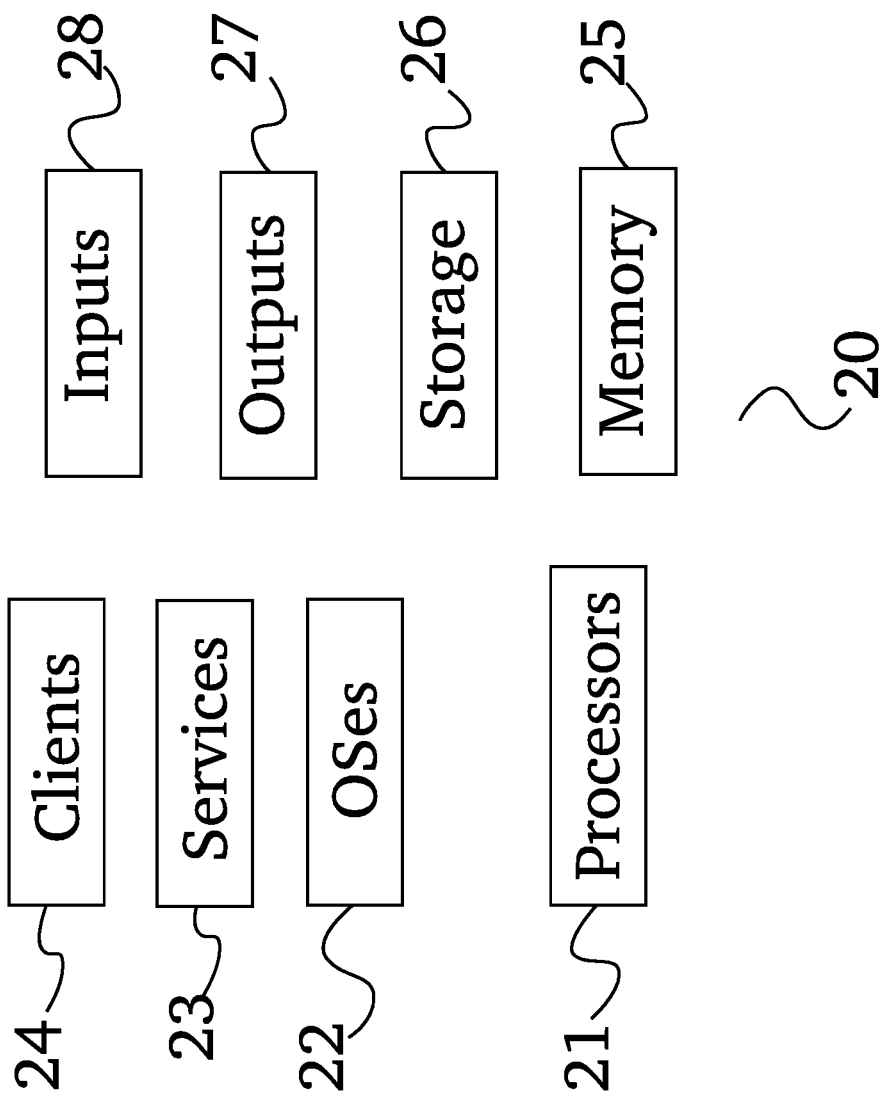
FIG. 6 is a block diagram illustrating an exemplary logical architecture for a client device, according to various embodiments of the invention.

In some aspects, systems may be implemented on a standalone computing system. Referring now to FIG. 6, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
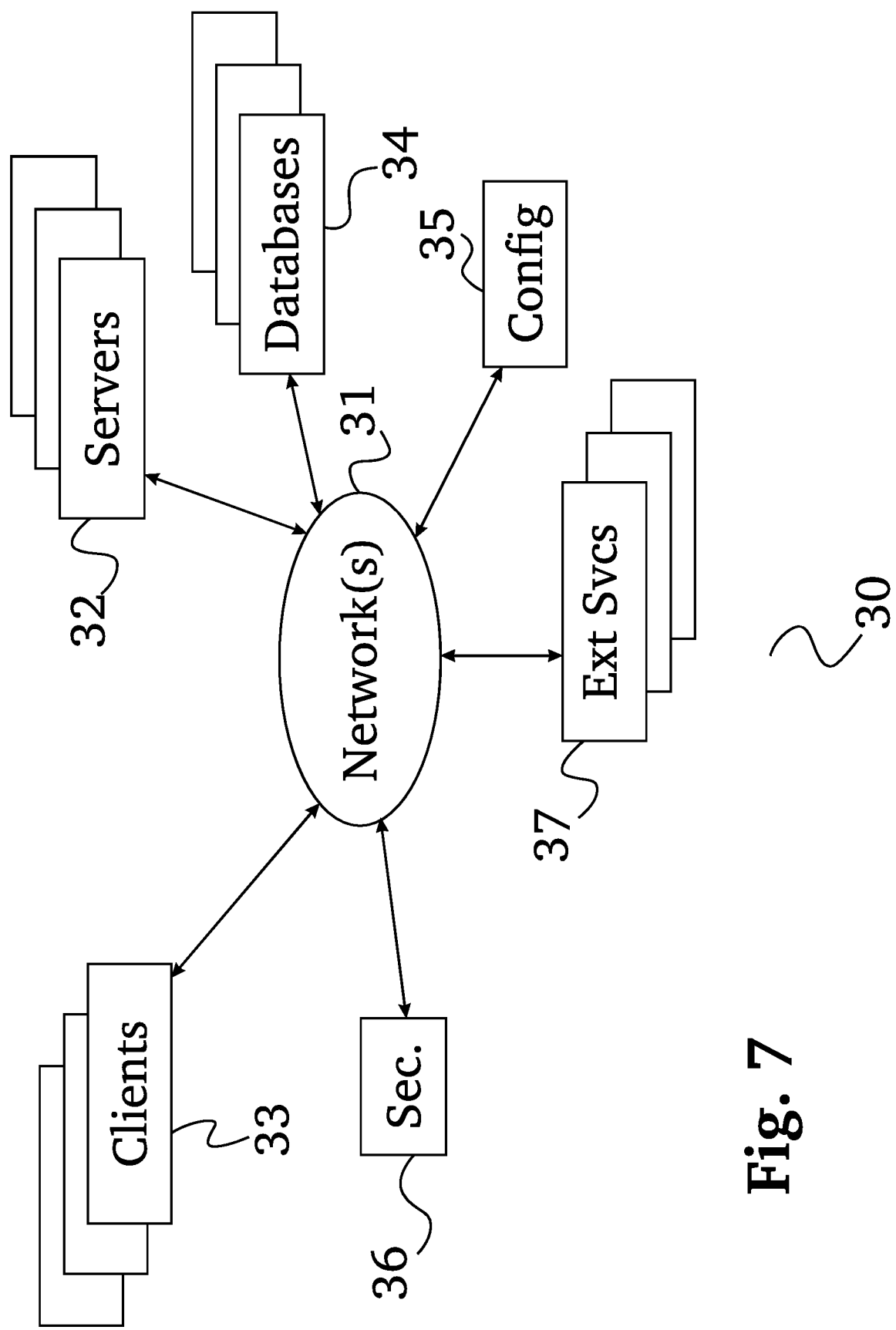
FIG. 7 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 8:
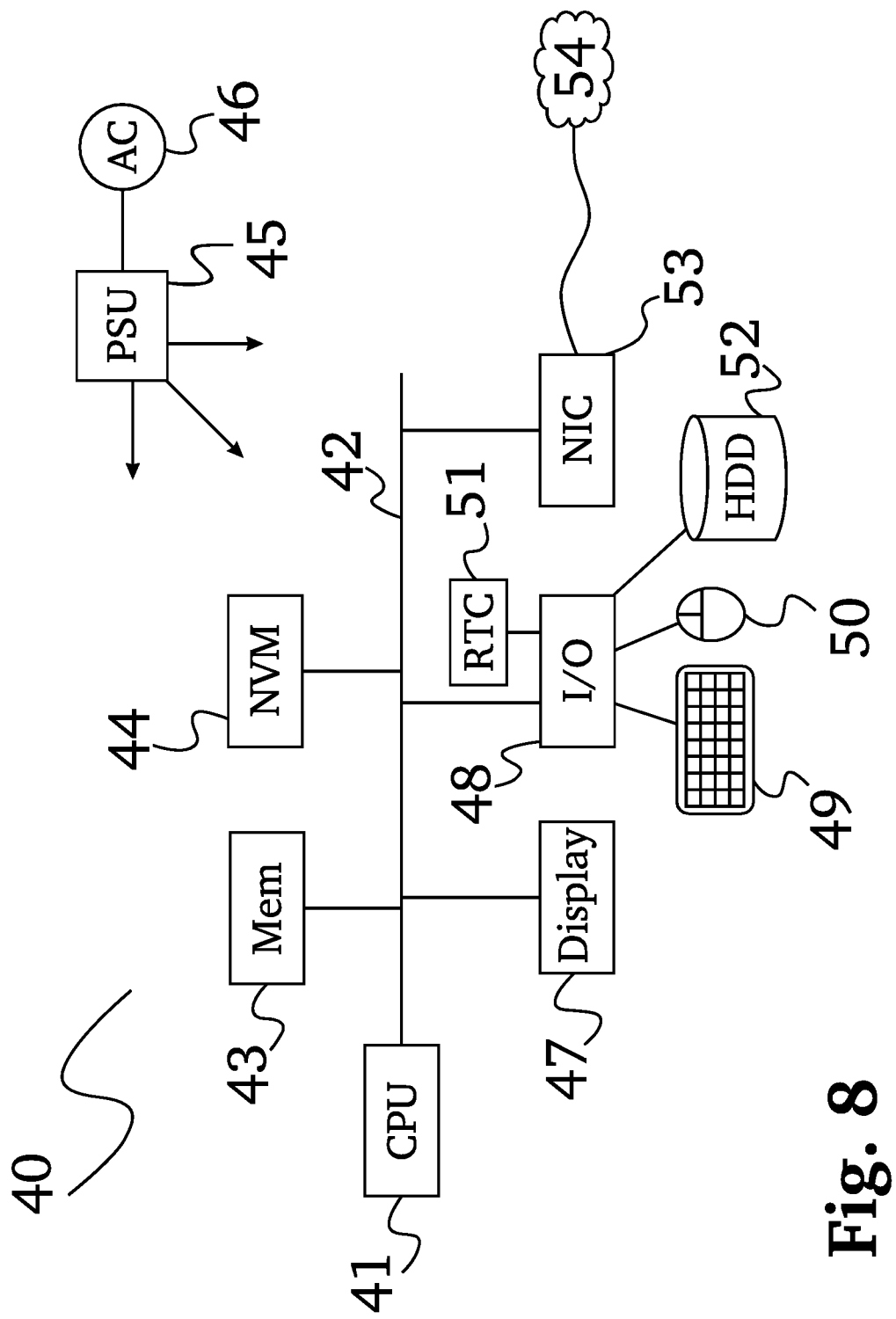
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

In some embodiments, data structures such as stacks or queues may be used instead of state machines. In some embodiments, the objects identified as matching patterns may be output as a larger object or objects, an array or linked list of objects, or some other data structure containing multiple objects or references to objects, all of which may be called hyper-objects, super-objects, or some other designation indicating that they are collections of objects that have matched certain patterns. In some embodiments, there will be a user interface that will allow the user to easily define patterns, for example, through the use of pre-defined templates, or by clicking and dragging relationship expressions in a graphical user interface. In some embodiments, the number of objects or patterns matched may be counted or cumulated in some fashion, and the results of the counting or cumulation may be displayed in tabular or graphical form. In some embodiments, the system may comprise machine learning algorithms, such that the system itself creates patterns to search based on certain areas of interest input by a user or developed by the machine learning algorithms from sets of training data.

The skilled person will be aware of a range of possible modifications of the various embodiments described above. Accordingly, the present invention is defined by the claims and their equivalents.

What is claimed is:

1. A system for object-oriented pattern matching in arbitrary data object streams, comprising:
   at least one state machine comprising at least a plurality of programming instructions stored in the memory of, and operating on at least one processor of, a computing device, wherein the plurality of programming instructions, when operating on the at least one processor, cause the computing device to:
   maintain an internal state model; and
   return a result when a final state has been reached, the final state being determined by the internal state model; and
   an object analysis server comprising at least a plurality of programming instructions stored in the memory of, and operating on at least one processor of, a computing device, wherein the plurality of programming instructions, when operating on the at least one processor, cause the computing device to:
   receive a plurality of data objects from a data source;
   analyze at least a portion of the data objects to determine at least their information structure and contents;
   receive a search pattern comprising at least one element;
   compare at least a portion of the data objects against at least one pattern of the search pattern, the comparison operation comprising at least the comparison of at least one element of a search pattern against the contents of a data object;
   create a new instance of a state machine when the comparison indicates that the object contains an element associated with the start of a search pattern, and associate that object with that state machine and the object's location in the search pattern for that state machine;
   update an instance of a state machine when the comparison indicates that the object contains an element associated with an element of a search pattern for which that state machine is waiting, and associate that object with that state machine and the object's location in the search pattern for that state machine;
   return the results of the operation of at least one state machine.

2. The system of claim 1, wherein the object analysis server is further configured to compare at least a portion of the search pattern against more than one data object at once.

3. The system of claim 1, wherein the state machines are further capable of receiving data from an input stream.

4. The system of claim 1, wherein the object analysis server is further configured to utilize a modified Boyer-Moore search algorithm to skip at least a portion of a data object based at least in part on the outcome of a previous comparison.

5. The system of claim 1, further comprising a message server comprising at least a plurality of programming instructions stored in the memory of, and operating on at least one processor of, a computing device, wherein the plurality of programming instructions, when operating on the at least one processor, cause the computing device to receive at least an update message from a client application; wherein the system updates data objects on the data source based at least on the update message.

6. The system of claim 5, wherein updated data objects are searchable in real-time.

7. A method for object-oriented pattern matching in arbitrary data object streams, comprising the steps of:
   maintaining an internal state model, using at least one state machine;
   returning a result when a final state has been reached, the final state being determined by the internal state model, using at least one state machine;
   receiving a plurality of data objects from a data source, using an object analysis server;
   analyzing at least a portion of the data objects to determine at least their information structure and contents, using an object analysis server;
   receiving a search pattern comprising at least one element, using an object analysis server;
   comparing at least a portion of the data objects against at least one pattern of the search pattern, the comparison operation comprising at least the comparison of at least one element of a search pattern against the contents of a data object, using an object analysis server;
   creating a new instance of a state machine when the comparison indicates that the object contains an element associated with the start of a search pattern, and associating that object with that state machine and the object's location in the search pattern for that state machine, using an object analysis server;
   updating an instance of a state machine when the comparison indicates that the object contains an element associated with an element of a search pattern for which that state machine is waiting, and associate that object with that state machine and the object's location in the search pattern for that state machine, using an object analysis server; and
   returning the results of the operation of at least one state machine.

8. The method of claim 7, wherein the object analysis server is further configured to compare at least a portion of the search pattern against more than one data object at once.

9. The method of claim 7, wherein the object analysis server is further configured to utilize a modified Boyer-Moore search algorithm to skip at least a portion of a data object based at least in part on the outcome of a previous comparison.

10. The method of claim 7, further comprising a message server comprising at least a plurality of programming instructions stored in the memory of, and operating on at least one processor of, a computing device, wherein the plurality of programming instructions, when operating on the at least one processor, cause the computing device to receive at least an update message from a client application;

wherein the system updates data objects on the data source based at least on the update message.

11. The method of claim 10, wherein updated data objects are searchable in real-time.

\* \* \* \* \*